United States Patent
Jöngren et al.

(10) Patent No.: US 9,667,395 B2
(45) Date of Patent: May 30, 2017

(54) DEMODULATION REFERENCE SIGNAL (DMRS) FORMAT SELECTION

(71) Applicant: Telefonaktiebolaget L M Ericsson (publ), Stockholm (SE)

(72) Inventors: George Jöngren, Sundbyberg (SE); Stefano Sorrentino, Solna (SE); Yu Yang, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 201 days.

(21) Appl. No.: 14/386,956

(22) PCT Filed: Apr. 11, 2014

(86) PCT No.: PCT/SE2014/050448
§ 371 (c)(1),
(2) Date: Sep. 22, 2014

(87) PCT Pub. No.: WO2014/168574
PCT Pub. Date: Oct. 16, 2014

(65) Prior Publication Data
US 2016/0211959 A1  Jul. 21, 2016

Related U.S. Application Data

(60) Provisional application No. 61/811,162, filed on Apr. 12, 2013.

(51) Int. Cl.
*H04W 24/00* (2009.01)
*H04W 72/04* (2009.01)
(Continued)

(52) U.S. Cl.
CPC .......... *H04L 5/0048* (2013.01); *H04L 5/0051* (2013.01); *H04W 24/08* (2013.01);
(Continued)

(58) Field of Classification Search
CPC ..... H04W 24/00; H04W 80/04; H04W 84/12; H04W 72/04; H04W 36/30
See application file for complete search history.

(56) References Cited

U.S. PATENT DOCUMENTS

2010/0246527 A1    9/2010  Montojo et al.
2012/0087442 A1*   4/2012  Xu .................. H04L 5/0051
                                                    375/299
(Continued)

OTHER PUBLICATIONS

China Telecom, "Discussion on spectral efficiency improvement for small cell enhancements", 3GPP TSG RAN WG1 Meeting #72, St Julian's, Malta, Jan. 28, 2013, pp. 1-6, R1-130354, 3GPP.
(Continued)

*Primary Examiner* — Andrew Lee
(74) *Attorney, Agent, or Firm* — Coats & Bennett, PLLC

(57) ABSTRACT

Techniques and apparatus for selectively switching among two or more possible reference signal densities are disclosed. An example method comprises obtaining (110) one or more reference signal conditions that governs the density of the reference signal format to be transmitted by a wireless communication device in conjunction with data transmissions, where the one or more reference signal conditions are defined in advance of any scheduling of those data transmissions. The example method further comprises evaluating (120) the one or more reference signal conditions and selecting (130) a density of a reference signal format, from two or more possible densities, based on the outcome of the evaluation. In embodiments where the node that carries out the evaluation is the transmitting node, the method further comprises transmitting (140) one or more reference signals in conjunction with one or more data transmissions, in accordance with the selected reference signal density.

27 Claims, 3 Drawing Sheets

(51) Int. Cl.
*H04L 5/00* (2006.01)
*H04W 24/08* (2009.01)
(52) U.S. Cl.
CPC ............ *H04L 5/006* (2013.01); *H04L 5/0023* (2013.01); *H04L 5/0064* (2013.01); *H04L 5/0069* (2013.01)

(56) References Cited

U.S. PATENT DOCUMENTS

| | | | |
|---|---|---|---|
| 2012/0320846 A1* | 12/2012 | Papasakellariou | H04W 72/042 370/329 |
| 2013/0242893 A1* | 9/2013 | Ishii | H04W 72/1278 370/329 |
| 2013/0265955 A1* | 10/2013 | Kim | H04W 72/04 370/329 |
| 2014/0179334 A1* | 6/2014 | Forenza | H04B 7/024 455/452.2 |
| 2014/0269492 A1* | 9/2014 | Forenza | H04B 7/0626 370/328 |
| 2015/0327244 A1* | 11/2015 | Pajukoski | H04L 5/0005 370/330 |
| 2015/0373694 A1* | 12/2015 | You | H04L 5/0051 370/329 |

OTHER PUBLICATIONS

Ericsson, et al., "On remaining details of DMRS for rank 2", 3GPP TSG RAN WG1 Meeting #63, Jacksonville, USA, Nov. 15, 2010, pp. 1-6, R1-105875, 3GPP.

Ericsson, et al., "Evaluation on UL DMRS Overhead Reduction", 3GPP TSG-RAN WG1 #72bis, Chicago, USA, Apr. 15, 2013, pp. 1-6, R1-131615, 3GPP.

Panasonic, "DMRS reduction for small cell", 3GPP TSG RAN WG1 Meeting #72bis, Chicago, USA, Apr. 15, 2013, pp. 1-6, R1-131327, 3GPP.

3rd Generation Partnership Project, "3rd Generation Partnership Project; Technical Specification Group Radio Access Network; Small Cell Enhancements for E-UTRA and E-UTRAN Physical Layer Aspects (Release 12)", Technical Report, 3GPP TR 36.872 V0.1.0, Apr. 1, 2013, pp. 1-26, 3GPP, France.

3rd Generation Partnership Project, "3rd Generation Partnership Project; Technical Specification Group Radio Access Network; Evolved Universal Terrestrial Radio Access (E-UTRA); Physical Channels and Modulation (Release 11)", Technical Specification, 3GPP TS 36.211 V11.2.0, Feb. 1, 2013, pp. 1-109, 3GPP, France.

* cited by examiner

DEMODULATION REFERENCE SIGNAL (DMRS) FORMAT SELECTION

BACKGROUND

In Long Term Evolution (LTE) wireless networks developed and standardized by members of the $3^{rd}$-Generation Partnership Project (3GPP) uplink (UL) communications (mobile-station-to-base-station transmissions) are generally based on the Single-Carrier Frequency-Division Multiple Access (SC-FDMA) scheme. SC-FDMA combines the desirable characteristics of Orthogonal Frequency Division Multiplexing (OFDM) with a relatively low Peak-to-Average Power Ratio (PAPR), which helps avoid excessive cost and power consumption of the mobile station, or "user equipment" (UE) in 3GPP terminology.

Just as in the LTE downlink (base-station-to-UE transmissions), LTE uplink transmissions incorporate two types of reference signals (RSs) to allow the base station (known as an "evolved Node B" or "eNB," in 3GPP terminology) to perform coherent data demodulation and channel sounding. These reference signals are referred to as demodulation reference signals (DMRS) and sounding reference signals (SRS).

So that the important single-carrier property for LTE uplink transmissions can be maintained, the DMRS transmitted by any given UE occupy the same bandwidth as the UE's user data or control channel transmissions. Generally, these data and control channel transmissions, accompanied by the DMRS, are transmitted using the Physical Uplink Shared Channel (PUSCH) and Physical Uplink Control Channel (PUCCH), respectively. In the case of PUSCH, the UE simply uses one OFDM symbol per slot for DMRS transmission, as shown in FIG. 1. FIG. 1 illustrates a 1-millisecond uplink subframe, which includes two slots that in turn each include seven OFDM symbols (assuming a normal cyclic prefix). The DMRS is sent in the fourth symbol of each slot. In the frequency domain, the transmitted signal spans N resource blocks, where each resource block spans 12 subcarriers at a 25-kilohertz spacing and where N depends on an uplink transmission grant sent to the UE by the serving eNB. In the case of PUCCH, the UE transmits and time multiplexes multiple PUCCH-RSs within each subframe, spanning the PUCCH bandwidth assigned to the UE.

DMRS from different UEs within the same cell potentially interfere with each other and (given a synchronized network) with DMRS transmitted by UEs in neighboring cells. To limit the level of interference between the DMRS from different UEs, several techniques that facilitate the use of orthogonal or semi-orthogonal DMRS have been introduced to the LTE specifications. Thus, it can be generally assumed that the DMRS for each of several UEs within a given cell are orthogonal to one another, while the DMRS transmitted by UEs in neighboring cells are semi-orthogonal to those in the given cell. It will be appreciated, however, that UEs compliant to Release 11 of the 3GPP specifications for LTE support techniques that provide for orthogonality between DMRS transmitted by UEs belonging to different cells.

According to the 3GPP specifications for LTE, each DMRS comprises a pseudo-random signal generated in the frequency domain, and enjoys some special properties that make it suitable for channel estimation. A Base Sequence Index (BSI), Cyclic Shift (CS), and possibly an Orthogonal Cover Code (OCC) are combined to determine the transmitted signal corresponding to each DMRS. The following provides more details.

A group index and a sequence index together define the so-called BSI. As of Release 11 of the LTE specifications, BSIs are assigned in a UE-specific fashion. Different base sequences are semi-orthogonal, which implies that some inter-sequence interference is typically present if no additional measures are taken to ensure orthogonality. The DMRS for a given UE is transmitted over the same bandwidth occupied by the corresponding data signal (e.g., PUCCH, PUCCH), and the base sequence is correspondingly generated so that the DMRS signal is a function of the bandwidth.

To minimize the impact of interference peaks on DMRS, LTE introduces interference randomization techniques. In particular, sequence hopping and group hopping (jointly referred to as SGH) are BSI randomization techniques that operate on a slot level. SGH can be enabled and disabled on a per-cell basis by the use of cell-specific parameters broadcast by the eNB. These parameters, referred to in 3GPP specifications as "Group-hopping-enabled" and "Sequence-hopping-enabled," affect group hopping and sequence hopping, respectively. For UEs compliant with at least Release 10 of the LTE specifications, SGH can be disabled in a UE-specific fashion by setting the UE-specific Radio Resource Control (RRC) parameter referred to as "Disable-sequence-group-hopping."

Additionally, cyclic shift hopping (CSH) patterns provide further DMRS interference randomization by applying a UE-specific pseudo-random cyclic shift (CS) on a slot-by-slot basis. A CSH pattern dictates the different CS offsets applied in each of the slots; this CSH pattern is known to both the UE and eNB, so that it can be compensated for during channel estimation at the receiver end of the link.

Cyclic shifts (CS) comprise linear phase shifts applied to each BSI in the frequency domain. Orthogonal cover codes (OCC) comprise orthogonal time domain codes, operating on the DMRS provided for each UL subframe. In principle, OCC can be applied to an arbitrary number of DMRS. Orthogonal DMRS between UEs can be achieved by using CS, if the UEs have the same bandwidth and BSI, and by using OCC if the UEs do not employ sequence group hopping (SGH) and instead employ the same cyclic shift hopping (CSH) pattern.

CS comprises a method to achieve orthogonality based on cyclic time shifts, under certain propagation conditions, among DMRSs generated from the same base sequence. Only eight different CS values can be dynamically indexed in Rel-8/9/10, even though in practice fewer than eight orthogonal DMRS can be achieved, depending on channel propagation properties (without considering OCC in this example). Even though CS is effective in multiplexing DMRSs assigned to fully overlapping bandwidths, orthogonality is lost when the bandwidths differ and/or when the interfering UE employs another base sequence or CSH pattern.

The OCC code [+1, −1] is able to suppress an interfering DMRS as long as the reference signal's contribution after the matched filter at the receiver is identical for both DMRSs of the same subframe. Similarly, the OCC code [+1, +1] is able to suppress an interfering DMRS as long as its contribution after the eNB matched filter has opposite sign respectively on the two DMRSs of the same subframe.

While base-sequences are assigned in a semi-static fashion, CS and OCC are dynamically assigned as part of the scheduling grant for each UL PUSCH transmission, and thus for PUSCH DMRS. The CS/OCC assignment method for PUCCH DMRS is different.

While different implementations are possible, a typical channel estimator performs a matched filter operation of the received signal corresponding to each DMRS with the known transmitted DMRS. The matched filter operation can be equivalently performed in time or frequency domains. If OCC is applied, the multiple DMRSs spanning the OCC code are combined according to the corresponding OCC.

Given the exploding demand for wireless data services, it is anticipated that the deployment of so-called "small cells" will be an important approach to improve network capabilities and to ensure seamless coverage. In some small cell scenarios, e.g., indoor and hotspot scenarios, the following characteristics are observed: small delay spread, low mobility, and a small number of users. These characteristics result in a relatively stationary channel in the time and frequency domains as well as relatively low Doppler shifts for small cells. Another characteristic is that it is not unusual to have a less-than-ideal backhaul connecting small cells to the rest of the network, with latency values up to 50 milliseconds. This results in slow coordination among small cells (and macro cells). Even with small cell scenarios, however, there remains a need for improved performance, e.g., improved spectral efficiency. Accordingly, it should be considered whether the currently defined approaches to the handling of DMRS and other reference signals can be improved, to better support the unique demands of small cells.

SUMMARY

Techniques detailed herein may be used to provide a wireless network with means for efficiently assessing whether conditions are appropriate for switching among two or more formats for demodulation reference signals (DMRS) or other reference signals, where at least one of the formats has a reduced density compared to one or more of the others. In some of the embodiments described herein, the UE is provided with rules for selectively switching to a format with a denser distribution of reference signals in each subframe, when certain conditions occur, or to a reduced density format when other conditions occur.

In general, the techniques disclosed herein allow a transmitting node to select a density for symbols of a reference signal within a subframe (or other transmission-time interval), based on an evaluation of one or more reference signal conditions. In one exemplary embodiment, the reference signal comprises a DMRS and the reference signal conditions comprise DMRS conditions. A DMRS condition comprises a condition that governs the density of the DMRS format to be transmitted by a wireless communication device in conjunction with different data transmissions (e.g., occurring at different times or in different subframes), and that is defined in advance of those data transmissions being scheduled. A DMRS condition therefore differs from a subframe-specific instruction received along with a scheduling grant.

Exemplary DMRS condition evaluations include whether the dense DMRS format (or the reduced DMRS format) has been used for more than a predetermined amount of time, whether the dense DMRS format (or the reduced DMRS format) has been used for more than a predetermined number of consecutive transmissions, whether a particular subframe has been designated for a dense or reduced DMRS format, and whether a scheduled wireless communication parameter is better suited for a dense or reduced DMRS parameter. For example, the DMRS condition evaluation may determine whether a scheduled bandwidth exceeds a predetermined minimum bandwidth applicable for a reduced DMRS format, or whether a scheduled transmission format (e.g., MCS and/or rank) is more applicable to a dense or a reduced DMRS format. In addition, a DMRS condition evaluation may include an evaluation of characteristics of the wireless channel and/or the UE, e.g., a UE's speed, a change in RF accuracy at the UE, and/or a change in the UE reception point (for coordinated multipoint reception).

An example method according to the disclosed techniques, which may be executed by a base station and/or a mobile station, comprises obtaining one or more reference signal conditions that governs the density of the reference signal format to be transmitted by a wireless communication device in conjunction with data transmissions, where the one or more reference signal conditions are defined in advance of any scheduling of those data transmissions. This example method further comprises evaluating the one or more reference signal conditions and selecting a density of a reference signal format, from two or more possible densities, based on the outcome of the evaluation. In embodiments where the node that carries out the evaluation is the transmitting node, the method further comprises transmitting one or more reference signals in conjunction with one or more data transmissions, in accordance with the selected reference signal density. In embodiments where the node that carries out the evaluation is the receiving node, the method further comprises processing reference signals in one or more data transmissions received from a transmitting node, in accordance with the selected reference signal density. This processing may include, for example, estimating a Doppler shift for the one or more data transmissions, using the reference signals.

An example wireless communication device, which may correspond to a base station or a mobile station, for example, comprises an evaluation circuit, a selection circuit, and a transceiver circuit. The evaluation circuit obtains one or more reference signal conditions that govern the density of the reference signal format to be transmitted by a wireless communication device in conjunction with one or more data transmissions, where the reference signal conditions are defined in advance of those data transmissions being scheduled. In addition, the evaluation circuit evaluates the reference signal conditions. The selection circuit selects a density of a reference signal format, from among two or more possible densities, based on the outcome of the evaluation. The transceiver circuit transmits the one or more reference signals according to the selected density, in some embodiments, or receives signals containing reference signals according to the selected density, in others.

Other example methods and apparatus according to the presently disclosed techniques for reference signal handling in a wireless network are described in detail below.

DETAILED DESCRIPTION

Figure 1:
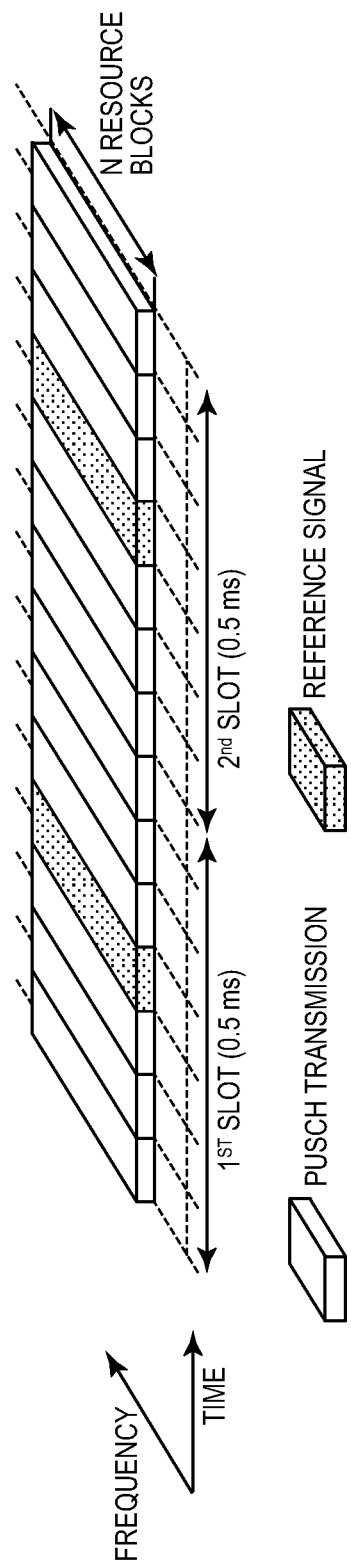
FIG. 1 illustrates an LTE uplink subframe, including DMRS.

The discussion below describes several techniques for handling reference signals in a wireless network, with much of the discussion specifically referencing demodulation reference signals (DMRS) in the context of uplink DMRS in LTE systems. It will be appreciated, however, that the techniques described herein may be applied to any reference signals used to assist with coherent demodulation, e.g., UE-specific reference signals. Likewise, while terminology from 3GPP LTE is used throughout this discussion to exemplify the inventive techniques disclosed herein, those skilled in the art will appreciate that these techniques are not limited to LTE. Other wireless systems, e.g., Wideband Code-Division Multiple-Access (WCDMA), WiMax, Ultra Mobile Broadband (UMB), GSM, etc., may also benefit from applications of the techniques described below.

Also, while the discussion below uses the 3GPP terms eNB (or eNodeB) and UE to explain the present techniques, the use of these terms herein should be considering non-limiting and does not imply that the disclosed techniques are applicable only to nodes having a certain hierarchical relationship. In general, then, "eNB" can be considered as simply a first device, while "UE" may be considered as a second device, where these two devices communicate with each other over some radio channel. Likewise, while the below discussion focuses on wireless transmissions in the uplink, the techniques described are equally applicable to the downlink.

As suggested above, improvements in network capacity and coverage can be achieved with the deployment of so-called "small cells," examples of which are often referred to as "pico-cells" or "femto-cells," to complement traditional macro-cellular network deployments. Further improvements in spectral efficiency are also essential to meeting the increasing demands for wireless data communications.

Reference signal overhead reduction represents one potential enhancement to improve spectral efficiency. Reducing the overhead consumed by reference signals is especially attractive in small cell scenarios. One reason is that these cells often serve users having relatively low mobility, which means that tracking channel conditions for these users can often be accomplished with fewer reference symbols. Another reason is that users in small cells often experience low frequency selectivity channels and hence fewer reference symbols in frequency domain can be utilized for accurate channel tracking.

Thus, one possible way to improve spectral efficiency is to reduce the density of a transmitted DMRS format. Both downlink and uplink DMRS overhead can be reduced. In the downlink for LTE, the overhead associated with DMRS is 7% for transmission ranks of 1 and 2, and 14% for transmission ranks greater than 2, assuming one OFDM symbol control region, two common reference symbol (CRS) ports, and a normal cyclic prefix. For uplink transmissions in LTE, DMRS occupies two OFDM symbols per subframe, which gives an overhead of 14%, regardless of the transmission rank.

In small cell scenarios, DMRS overhead reduction is perceived to be an option for increasing the spectral efficiency. A common view on uplink DMRS overhead reduction is to simply use one DMRS symbol in a subframe, to reduce the overhead by 50%. Uplink DMRS overhead might be reduced by 50%, for example, by simply removing every second DMRS symbol and allowing data to be transmitted in the OFDM symbol previously occupied by DMRS. With this approach, as much as a 7% throughput gain can be achieved, theoretically.

In current LTE systems, an eNB may estimate the Doppler shift based on channel estimation on two DMRS symbols in the uplink for every subframe. However, with a reduced DMRS, e.g., only one DMRS symbol/subframe, it is difficult to estimate the Doppler shift of the signal. Note that uplink sounding reference symbols (SRS) are not suitable for Doppler estimation, since Doppler estimation requires multiple reference signals to be correlated, while uplink SRS are single-shot signals per subframe, and phase stability between subframes cannot be guaranteed. Thus, the inability to perform Doppler shift estimation results in a degraded performance.

Reduced DMRS is proven to be beneficial for overhead reduction, provided that the channel estimation quality is not significantly affected by the reduction of resources for channel estimation. For low delay spread and Doppler shift, the channel is approximately constant over the subframe, and a single DMRS per subframe may be sufficient for accurate channel estimation over the whole subframe. It should be noted that the Doppler shift in particular depends on the combination of UE mobility, propagation properties, and RF non-idealities between the UE and the network. Considering that a UE behaves by default as a legacy Release-8-compliant UE when accessing the network at initial access, it is possible for the network to assess at initial access whether a UE is a suitable candidate for DMRS reduction. However, the conditions that make a UE suitable for using reduced DMRS may not be constant over time, due to the UE's mobility, for example.

Given that reduced density uplink DMRS transmissions are permitted, one possible approach to managing these transmissions is to signal to the UE, e.g., in each subframe, the preferred PUSCH format for a subsequent transmission. The signal might indicate a "dense DMRS format" or "reduced density DMRS format," for example, where "dense" and "reduced density" correspond to two predetermined DMRS formats. This approach, however, would consume precious scheduling grant resources. Further, this approach would be difficult to implement in LTE systems, since legacy grants cannot be modified in the common search space for backwards compatibility reasons.

The techniques detailed below may be used to provide a wireless network with means for efficiently assessing whether conditions are appropriate for switching among two or more formats for demodulation reference signals (DMRS) or other reference signals, where at least one of the formats has a reduced density compared to one or more of the others. In some of the embodiments described herein, the UE is provided with rules for selectively switching to a format with a denser distribution of reference signals in each subframe, when certain conditions occur, or to a reduced density format when other conditions occur.

In general, the techniques described herein allow a transmitting node to select a density for symbols of a reference signal within a subframe (or other transmission-time interval), based on an evaluation of one or more reference signal conditions. In one exemplary embodiment, the reference signal comprises a DMRS and the reference signal conditions comprise DMRS conditions. A DMRS condition comprises a condition that governs the density of the DMRS format to be transmitted by a wireless communication device in conjunction with different data transmissions (e.g., occurring at different times or in different subframes), and that is defined in advance of those data transmissions being scheduled. A DMRS condition therefore differs from a subframe-specific instruction received along with a scheduling grant.

Exemplary DMRS condition evaluations include whether the dense DMRS format (or the reduced DMRS format) has been used for more than a predetermined amount of time, whether the dense DMRS format (or the reduced DMRS format) has been used for more than a predetermined number of consecutive transmissions, whether a particular subframe has been designated for a dense or reduced DMRS format, and whether a scheduled wireless communication parameter is better suited for a dense or reduced DMRS parameter. For example, the DMRS condition evaluation may determine whether a scheduled bandwidth exceeds a predetermined minimum bandwidth applicable for a reduced DMRS format, or whether a scheduled transmission format (e.g., MCS and/or rank) is more applicable to a dense or a reduced DMRS format. In addition, a DMRS condition evaluation may include an evaluation of characteristics of the wireless channel and/or the UE, e.g., a UE's speed, a change in RF accuracy at the UE, and/or a change in the UE reception point (for coordinated multipoint reception). It will be appreciated that the DMRS condition evaluation may include an evaluation of one or more DMRS conditions. It will further be appreciated that a standard and/or the network may define the DMRS conditions used for the evaluation(s).

Figure 2:
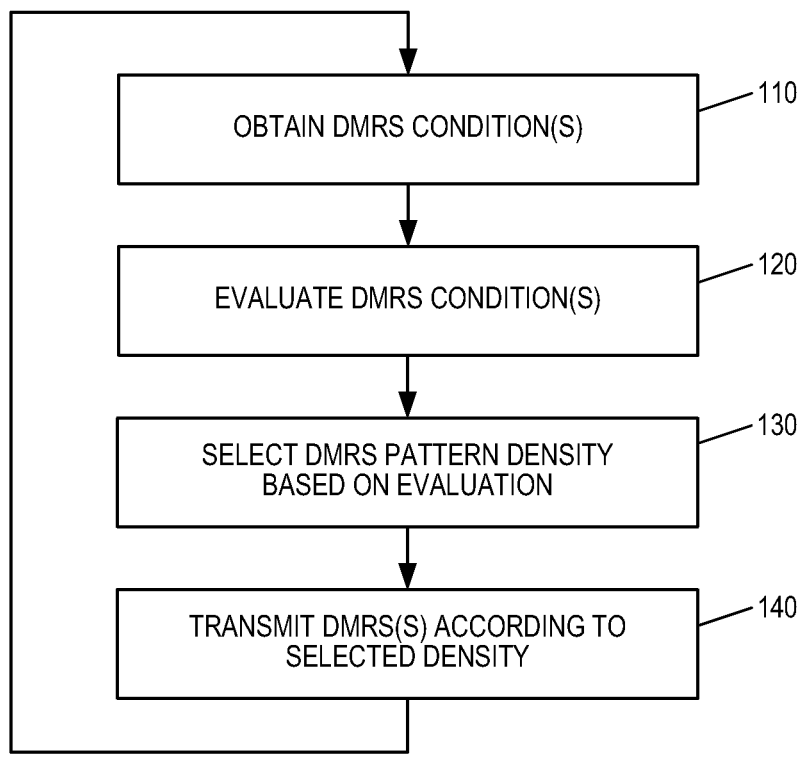
FIG. 2 is a process flow diagram illustrating an example method for determining a reference signal density for reference signals associated with data transmissions by a transmitting node.

FIG. 2 shows one exemplary method 100 for selecting a density of a DMRS format. The illustrated method is compatible with legacy grant formats and does not require the use of scheduling grant resources. As shown at block 110, the method includes obtaining one or more reference signal conditions that govern reference signal density for reference signals transmitted in conjunction with one or more data transmissions. The one or more reference signal conditions are defined in advance of any scheduling of the one or more data transmissions. More specifically, as indicated in the figure, these reference signal conditions may be DMRS conditions that govern the density of a DMRS format to be transmitted by a wireless communication device to a remote wireless communication device. However, the method is more generally applicable.

As shown at blocks 120 and 130, the illustrated method also comprises evaluating the one or more reference signal conditions and selecting a reference signal density, e.g., a DMRS pattern density, from among two or more possible densities, based on the evaluation. Thus, for example, if the evaluation indicates that a reduced DMRS requirement is met, a reduced density DMRS format is selected, e.g., one DMRS per subframe. If the evaluation fails a reduced DMRS requirement, on the other hand, a dense DMRS format is selected, e.g., two DMRSs per subframe.

In the method shown in FIG. 2, the reference signals are subsequently transmitted according to the selected density, as shown at block 140. It will be appreciated, however, that the operations shown in blocks 110, 120, and 130 may be carried out at a receiving node, in some embodiments, to determine the density of reference signals associated with a signal received from a remote transmitting node. In these embodiments, the operation shown at block 140 may be replaced with the processing of a received signal containing reference signals according to the selected density. This processing may comprise, for example, performing channel estimation using the reference signals, and/or performing Doppler shift estimation using the reference signals, at least for those reference signal densities/formats that facilitate Doppler shift estimation. It will further be appreciated that at least the evaluation and/or selection operations of blocks 120 and 130 may be repeated, e.g., for every scheduled data transmission, periodically, etc., as shown in FIG. 2. In some cases, new reference signal conditions may be obtained from time to time.

Example reference signal conditions that can be evaluated include whether a dense reference signal format (e.g., a dense DMRS format) or a reduced density reference signal format has been used for more than a predetermined amount of time, whether the dense reference signal format or the reduced density reference signal format has been used for more than a predetermined number of consecutive transmissions, whether a particular subframe has been pre-designated for a dense or reduced reference signal format, and whether a scheduled wireless communication parameter is better suited for a dense or reduced signal format parameter. For example, a DMRS condition evaluation may determine whether a scheduled bandwidth exceeds a predetermined minimum bandwidth applicable for a reduced DMRS format, or whether a scheduled transmission format (e.g., MCS and/or rank) is more applicable to a dense or a reduced DMRS format. In addition, a DMRS condition evaluation may include an evaluation of any one or more of the following, each of which represents an example of a parameter or event that may affect the eligibility of a UE to use a reduced density DMRS format for one or more subframes:

UE speed or a change in UE speed (note that the network is in general not aware of the UE speed);

UE radio-frequency (RF) accuracy (e.g., degraded frequency synchronization that results in increased Doppler shift), or a change in UE RF accuracy, either of which may be temperature dependent;

reception point(s) or a change in reception point(s) for a UE (e.g., for uplink coordinated multipoint reception), where the UE has a different equivalent Doppler shift towards the new reception point(s). (Note: the network may be unaware, in general, of the relative difference in nominal frequencies at different reception points);

a change in the propagation environment, including increased channel frequency selectivity. In case of increased frequency selectivity, for example, the processing gain (e.g., the capacity of the channel estimator to suppress noise when performing estimation) is reduced. In this case, increasing the density of DMRS would allow a larger processing gain; however it is not straightforward for the estimator algorithm to quantify the increased processing gain with additional DMRS;

a change in the transmission format used by the UE (e.g., transmission rank). A higher rank transmission is typically more sensitive to errors in the channel estimation, and therefore dense DMRS are likely to be more useful when using high rank transmission. However, the network is not aware, in general, of the potential performance gain obtained by increasing the density of the DMRS(s).

It will be appreciated that any one or more of these events may be used as all or part of a DMRS condition, or that any of the related parameters may be used as part of a condition.

In some embodiments of the method shown in FIG. 2, one or more of the reference signal conditions are obtained by receiving reference signal density information from a second node (e.g., from a serving eNB), the reference signal density information indicating a rule for selecting a reference signal density.

Correspondingly, a method like that shown in FIG. 2, may comprise sending information identifying one or more of the reference signal conditions to a remote node, e.g., from a transmitting node to a receiving node.

In other embodiments or in some of these embodiments, one or more reference signal conditions are obtained by retrieving a stored rule for selecting a reference signal density. This rule may have been permanently stored, e.g., during manufacture of the device, or may be a semi-statically configured parameter.

As suggested above, the evaluating of the one or more reference signal conditions may include evaluating one or more of the following, in various embodiments: a mobile terminal speed or a change in mobile terminal speed; frequency accuracy or a change in frequency accuracy at the node; one or more reception points for transmissions by the node, or a change in reception points for transmissions by the node; signal propagation conditions or a change in signal propagation conditions; and/or a transmission format used by the node or a change in transmission format used by the node.

In some embodiments, evaluating the one or more reference signal conditions includes evaluating a time since a particular reference signal density of the two or more possible densities, e.g., a densest reference signal density of the two or more possible densities, was used by the node transmitting the one or more data transmissions. In others, this evaluating may include evaluating a previously configured pattern defining the usage of two or more reference signal densities by the node. In still others, evaluating the one or more reference signal conditions includes evaluating one or more scheduling parameters according to the reference signal conditions.

In some embodiments, the one or more reference signal conditions include a predetermined bandwidth threshold, such that selecting a reference signal density comprises selecting a densest reference signal density of the two or more possible densities in response to determining that a scheduled bandwidth for a data transmission is below the predetermined bandwidth threshold. Similarly, in some embodiments, the one or more reference signal conditions include a transmission rank threshold, such that selecting a reference signal density comprises selecting a densest reference signal density of the two or more possible densities in response to determining that a transmission rank for a data transmission exceeds the predetermined transmission rank threshold.

As noted above, the one or more reference signals comprise one or more demodulation reference signals, in some embodiments. In some embodiments, the one or more reference signals may include mobile-terminal-specific reference signals, e.g., UE-specific reference signals in a downlink transmission. While it will be appreciated that the illustrated method and the techniques described herein are more generally applicable, some embodiments are specifically applicable to an LTE wireless network, where the two or more possible densities comprise a first reference signal density of one orthogonal frequency-division multiplexing (OFDM) symbol for DMRS per transmit subframe and a second reference signal density of two OFDM symbols for DMRS per transmit subframe.

Following are a number of example embodiments of the techniques described above. It should be noted, however, that these embodiments are not mutually exclusive. Components from any one of these embodiments may be tacitly assumed to be present in or applicable to another embodiment, and it will be obvious to a person skilled in the art how those components may be used in the other exemplary embodiments. Further, while the following describes these examples in terms of a "dense" and a "reduced" DMRS format, it will be appreciated that the techniques disclosed herein are not limited to two DMRS formats, and are not limited to "dense" and "reduced density" DMRS formats. In addition, it will be appreciated that the density of a reference signal format refers to the relative proportion of reference signal symbols in a subframe or other transmission-time interval.

In a first example embodiment, a rule for dynamically (e.g., periodically) switching the UE to and from a dense DMRS format (e.g., to and from the legacy format with two DMRSs/subframe) is defined. This rule is known to both the network and the UE. In some cases the rule may be configured for a given UE or group of UEs, e.g., using RRC signaling, while in other cases the rule may be specified by a standard; a combination of these approaches may also be used.

In some of these embodiments, when a UE is configured to allow it to transmit using a DMRS format with reduced density (e.g., one DMRS/subframe), the UE verifies at each uplink transmission occasion whether the conditions in the rule are met. If the conditions in the rule are met, the UE employs the dense DMRS. If the conditions in the rule are not met, the UE keeps employing the reduced density DMRS format as configured by the network.

In a second example embodiment, the rule referred to above includes verifying whether the time elapsed since the last transmission of a dense DMRS format by the UE has exceeded some predetermined value X, where X may be defined in a standard or configured by the network. The time may be expressed in seconds, for example, or by indicating a number of subframes. A time may be indirectly indicated, in some embodiments. For instance, the number of uplink transmissions (e.g., scheduled PUSCH transmissions) that have occurred since the last transmission of a dense DMRS format may be compared to a threshold X, where the value X may be defined in a standard or configured by the network.

In another example embodiment, a semi-statically configurable subframe pattern may be defined, the pattern defining a dense/reduced density DMRS format for use with PUSCH transmissions. In the simplest case, such a subframe pattern may be periodic, with a subframe offset defining the starting point of the pattern with respect to an index point known to both the network and the UE. Uplink transmissions that happen to occur in subframes designated by this pattern will use a dense/reduced density DMRS format. This solution maintains consistent states in the eNB and UE while giving the eNB the choice of a DMRS density based on in which subframe the uplink transmission (or possibly uplink grant) takes place.

In another example embodiment, the UE switches between a dense DMRS format and a reduced density DMRS format, depending on the scheduling parameters. For example, because processing gain is typically smaller for smaller scheduled bandwidths, the UE may switch between the dense and reduced density DMRS formats depending on the scheduled bandwidth. If the scheduled bandwidth is below a certain (possibly configurable) threshold, the UE employs the dense DMRS format; otherwise the UE employs the reduced density DMRS format.

In another example, the UE switches between the dense DMRS and reduced density DMRS formats depending on the transmission format, e.g., the Modulation and Coding Scheme (MCS) for the transmission and/or a spatial rank for the transmission. In this case, the UE may switch autonomously to a dense DMRS format when the network schedules certain transmission formats. For example, when the rank exceeds a (possibly configured) threshold, the UE switches to a dense DMRS format.

Figure 3:
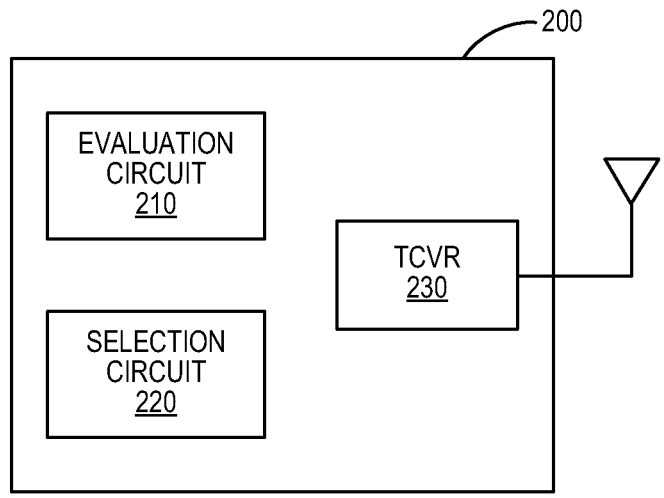
FIG. 3 is a block diagram illustrating an example wireless device adapted to carry out one or more of the techniques detailed herein.

FIG. 3 is a block diagram illustrating an exemplary wireless communication device 200, e.g., an eNB or a UE, configured to carry out one or more of the methods described above. Wireless communication device 200 comprises an evaluation circuit 210, a selection circuit 220, and a transceiver 230. Evaluation circuit 210 obtains and evaluates at least one reference signal condition, e.g., a DMRS condition, while selection circuit 220 selects a reference signal density from among two or more possibility densities, based on the outcome of the evaluation. The transceiver 230 transmits the DMRS, along with a data transmission, according to the selected format/density. The transceiver 230 may also transmit/receive information to/from a remote device, including information critical for performing the evaluation. While not explicitly shown in FIG. 3, it will be appreciated that the wireless communication device 200 may also include a memory for storing thresholds and/or other information necessary to define and evaluate the DMRS condition. Further, while FIG. 3 shows an evaluation circuit 210 that obtains and evaluates the DMRS condition(s), it will be appreciated that one circuit may be used to obtain the DMRS condition(s), and a separate circuit may be used to evaluate the DMRS condition(s).

In various embodiments, one or more of the methods described above may be performed, at least in part, by a processing circuit. In some embodiments, the processing circuit is a programmable circuit configured with appropriate program code, stored in one or more suitable memory devices, to implement one or more of the techniques described herein. Of course, it will be appreciated that not all of the steps of these techniques are necessarily performed in a single microprocessor or even in a single module.

Figure 4:
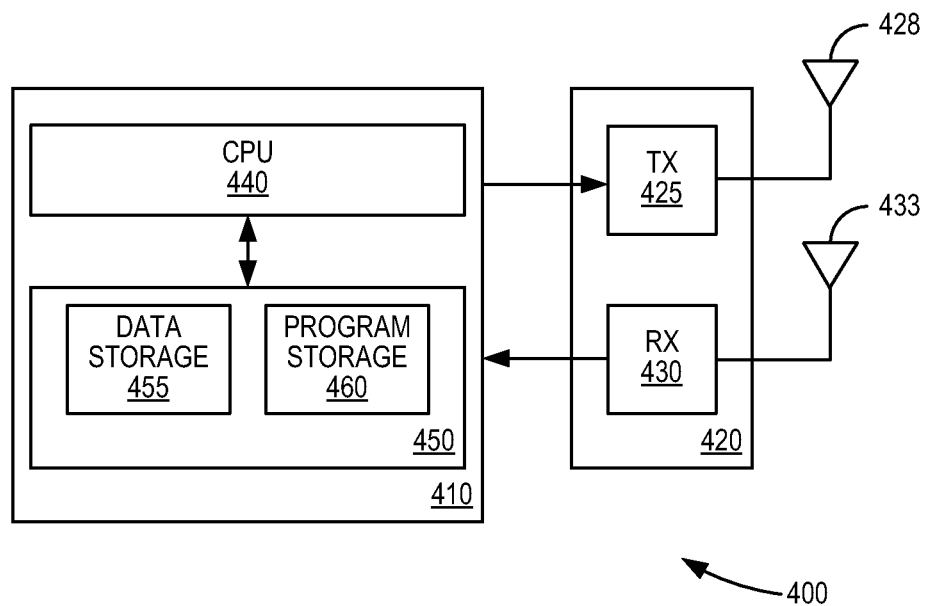
FIG. 4 is a block diagram providing another representation of an example wireless device.

Accordingly, FIG. 4 is a block diagram illustrating a different representation of a wireless communication device configured to carry out one or more of the techniques described herein. Wireless device 400, which may be a UE or eNB configured for operation with an LTE network (E-UTRAN), for example, comprises a transceiver unit 420, which includes radio circuitry adapted for handling radio communications to and from a remote wireless device, e.g., for communicating with one or more base stations in a 3GPP network. Device 400 also includes a processing circuit 410 for processing the signals transmitted and received by the transceiver unit 420.

Transceiver unit 420 includes a transmitter 425 coupled to one or more transmit antennas 428 and receiver 430 coupled to one or more receiver antennas 433. The same antenna(s) 428 and 433 may be used for both transmission and reception. Receiver 430 and transmitter 425 use known radio processing and signal processing components and techniques, typically according to a particular telecommunications standard such as the 3GPP standards for LTE. Note also that transmitter unit 420 may comprise separate radio and/or baseband circuitry for each of two or more different types of radio access network, such as radio/baseband circuitry adapted for E-UTRAN access and separate radio/baseband circuitry adapted for Wi-Fi access. The same applies to the antennas—while in some cases one or more antennas may be used for accessing multiple types of networks, in other cases one or more antennas may be specifically adapted to a particular radio access network or networks. Because the various details and engineering tradeoffs associated with the design and implementation of such circuitry are well known and are unnecessary to a full understanding of the invention, additional details are not shown here.

Processing circuit 410 comprises one or more processors 440 coupled to one or more memory devices 450 that make up a data storage memory 455 and a program storage memory 460. Processor 440, identified as CPU 440 in FIG. 4, may be a microprocessor, microcontroller, or digital signal processor, in some embodiments. More generally, processing circuit 410 may comprise a processor/firmware combination, or specialized digital hardware, or a combination thereof. Memory 450 may comprise one or several types of memory such as read-only memory (ROM), random-access memory, cache memory, flash memory devices, optical storage devices, etc. In some cases, processing circuit 410 may include separate processing resources dedicated to one or several radio access technologies. Again, because the various details and engineering tradeoffs associated with the design of baseband processing circuitry for mobile devices are well known and are unnecessary to a full understanding of the invention, additional details are not shown here.

Typical functions of the processing circuit 410 include modulation and coding of transmitted signals and the demodulation and decoding of received signals. In several embodiments of the present invention, processing circuit 410 is adapted, using suitable program code stored in program storage memory 460, for example, to carry out one or more of the techniques described above, including any one of the methods discussed in connection with FIG. 2. Of course, it will be appreciated that not all of the steps of these techniques are necessarily performed in a single microprocessor or even in a single module.

It will be appreciated that the processing circuit 410, as adapted with program code stored in memory 450, can implement the process flow of FIG. 2, or variants thereof, using an arrangement of functional "modules," where the modules are computer programs or portions of computer programs executing on the processor circuit 410. Thus, the apparatus 400 can be understood as comprising several functional modules implemented with processing circuitry 410, including memory 450. These functional modules might correspond to the evaluation circuit 210 and selection circuit 220 shown in FIG. 3, for example, where the evaluation module/circuit is configured to obtain one or more reference signal conditions that govern reference signal density for reference signals transmitted in conjunction with one or more data transmissions, wherein the one or more reference signal conditions are defined in advance of any scheduling of the one or more data transmissions, and to evaluate the one or more reference signal conditions, while the selection module/circuit is configured to select a reference signal density from among two or more possible densities, based on the evaluation. It will be understood that a different partitioning of the functionality described herein, into a different set of functional modules, is also possible.

The techniques and apparatus disclosed herein enable the switching between different density reference signal formats without extra signaling or modification for legacy scheduling grants, to facilitate the performance gains achievable through reference signal overhead reduction. More particularly, these techniques and apparatus facilitate the reduction of overhead consumed by uplink DMRS in an LTE system, allowing one DMRS density, e.g., a reduced DMRS density, to be used when possible while still providing high spectral efficiency, and otherwise enabling a different density to be used when more robust transmission and/or Doppler shift estimation are needed.

It will be appreciated, of course, that the disclosed techniques may be carried out in other ways than those specifically set forth herein without departing from essential characteristics of the inventive techniques described herein. The present embodiments are thus to be considered in all respects as illustrative and not restrictive, and all changes coming within the meaning and equivalency range of the appended claims are intended to be embraced therein.

What is claimed is:

1. A method, in a first node in a wireless network, for determining a reference signal density for reference signals associated with one or more data transmissions by a transmitting node, wherein the first node comprises the transmitting node, the method comprising:
obtaining one or more reference signal conditions that govern reference signal density for reference signals transmitted in conjunction with the one or more data transmissions, wherein the one or more reference signal conditions are defined in advance of any scheduling of the one or more data transmissions;
evaluating the one or more reference signal conditions;
selecting a reference signal density from among two or more possible densities, based on the evaluation; and
transmitting one or more reference signals in conjunction with the one or more data transmissions in accordance with the selected reference signal density.

2. The method of claim 1, wherein obtaining the one or more reference signal conditions comprises receiving reference signal density information from a second node, the received reference signal density information indicating a rule for selecting a reference signal density.

3. The method of claim 1, wherein obtaining the one or more reference signal conditions comprises retrieving a stored rule for selecting the reference signal density.

4. The method of claim 1, wherein evaluating the one or more reference signal conditions comprises evaluating at least one of:
a mobile terminal speed or a change in the mobile terminal speed;
a frequency accuracy or a change in the frequency accuracy at a mobile terminal;
one or more reception points for transmissions by the transmitting node, or a change in the reception points for transmissions by the transmitting node;
signal propagation conditions or a change in signal propagation conditions; and
a transmission format used by the transmitting node or a change in transmission format used by the transmitting node.

5. The method of claim 1, wherein evaluating the one or more reference signal conditions comprises evaluating a time since a densest reference signal density of the two or more possible densities was used by the transmitting node.

6. The method of claim 1, wherein evaluating the one or more reference signal conditions comprises evaluating a previously configured pattern defining the usage of two or more reference signal densities by the transmitting node.

7. The method of claim 1, wherein evaluating the one or more reference signal conditions comprises evaluating one or more scheduling parameters according to the reference signal conditions.

8. The method of claim 7, wherein the one or more reference signal conditions comprises a predetermined bandwidth threshold, and wherein selecting the reference signal density comprises selecting a densest reference signal density of the two or more possible densities in response to determining that a scheduled bandwidth for a data transmission is below the predetermined bandwidth threshold.

9. The method of claim 7, wherein the one or more reference signal conditions comprises a transmission rank threshold, and wherein selecting the reference signal density comprises selecting a densest reference signal density of the two or more possible densities in response to determining that a transmission rank for a data transmission exceeds the predetermined transmission rank threshold.

10. The method of claim 1, wherein one or more of the reference signals comprise one or more mobile-terminal-specific reference signals.

11. The method of claim 10, wherein the one or more mobile-terminal-specific reference signals comprise one or more demodulation reference signals.

12. The method of claim 1, further comprising sending information identifying the one or more of the reference signal conditions to a remote node.

13. The method of claim 1, in a Long-Term Evolution (LTE) wireless network, wherein the two or more possible densities comprise a first reference signal density of one orthogonal frequency-division multiplexing (OFDM) symbol for demodulation reference signal (DMRS) per transmit subframe and a second reference signal density of two OFDM symbols for DMRS per transmit subframe.

14. A wireless communication device in a wireless network for determining a reference signal density for reference signals associated with one or more data transmissions by a transmitting node, wherein the wireless communication device comprises the transmitting node, the wireless communication device comprising:
a transceiver circuit configured to communicate wirelessly with one or more other devices; and
one or more processing circuits configured to:
obtain one or more reference signal conditions that govern reference signal density for reference signals transmitted in conjunction with the one or more data transmissions, wherein the one or more reference signal conditions are defined in advance of any scheduling of the one or more data transmissions;
evaluate the one or more reference signal conditions; and
select a reference signal density from among two or more possible densities, based on the evaluation; and
transmit one or more reference signals in conjunction with the one or more data transmissions using the transceiver circuit in accordance with the selected reference signal density.

15. The wireless communication device of claim 14, wherein the one or more processing circuits are configured to obtain the one or more reference signal conditions by receiving reference signal density information from a second node, using the transceiver circuit, the received reference signal density information indicating a rule for selecting a reference signal density.

16. The wireless communication device of any of claim 14, wherein the one or more processing circuits are configured to obtain the one or more reference signal conditions by retrieving a stored rule for selecting the reference signal density.

17. The wireless communication device of claim 14, wherein the one or more processing circuits are configured to evaluate the one or more reference signal conditions by evaluating at least one of:
a mobile terminal speed or a change in mobile terminal speed;

a frequency accuracy or a change in frequency accuracy at a mobile terminal;

one or more reception points for transmissions by the transmitting node, or a change in reception points for transmissions by the transmitting node;

signal propagation conditions or a change in signal propagation conditions; and a transmission format used by the transmitting node or a change in transmission format used by the transmitting node.

18. The wireless communication device of claim 14, wherein the one or more processing circuits are configured to evaluate the one or more reference signal conditions by evaluating a time since a densest reference signal density of the two or more possible densities was used by the transmitting node.

19. The wireless communication device of claim 14, wherein the one or more processing circuits are configured to evaluate the one or more reference signal conditions by evaluating a previously configured pattern defining the usage of two or more reference signal densities by the transmitting node.

20. The wireless communication device of claim 14, wherein the one or more processing circuits are configured to evaluate the one or more reference signal conditions by evaluating one or more scheduling parameters according to the reference signal conditions.

21. The wireless communication device of claim 20, wherein the one or more reference signal conditions comprises a predetermined bandwidth threshold, and wherein the one or more processing circuits are configured to select the reference signal density by selecting a densest reference signal density of the two or more possible densities in response to determining that a scheduled bandwidth for a data transmission is below the predetermined bandwidth threshold.

22. The wireless communication device of claim 20, wherein the one or more reference signal conditions comprises a transmission rank threshold, and wherein the one or more processing circuits are configured to select the reference signal density by selecting a densest reference signal density of the two or more possible densities in response to determining that a transmission rank for a data transmission exceeds the predetermined transmission rank threshold.

23. The wireless communication device of claim 14, wherein one or more of the reference signals comprise one or more mobile-terminal-specific reference signals.

24. The wireless communication device of 23, wherein the one or more mobile-terminal-specific reference signals comprise one or more demodulation reference signals.

25. The wireless communication device of claim 14, wherein the one or more processing circuits are further configured to send information identifying one or more of the reference signal conditions to a remote node using the transceiver circuit.

26. The wireless communication device of claim 14, wherein the wireless communication device is adapted for use in a Long-Term Evolution (LTE) wireless network, and wherein the two or more possible densities comprise a first reference signal density of one orthogonal frequency-division multiplexing (OFDM) symbol for demodulation reference signal (DMRS) per transmit subframe and a second reference signal density of two OFDM symbols for DMRS per transmit subframe.

27. A wireless communication device, comprising:

a transceiver circuit configured to communicate wirelessly with one or more other devices;

an evaluation circuit configured to:

obtain one or more reference signal conditions that govern reference signal density for reference signals transmitted in conjunction with one or more data transmissions, wherein the one or more reference signal conditions are defined in advance of any scheduling of the one or more data transmissions; and evaluate the one or more reference signal conditions; and a selection circuit configured to select a reference signal density from among two or more possible densities based on the evaluation;

wherein the transceiver circuit is further configured to transmit one or more reference signals in conjunction with the one or more data transmissions in accordance with the selected reference signal density.

* * * * *